May 26, 1964     C. A. GUDERJAN ETAL     3,134,280
ROTARY MOWER BLADE HOLDER
Filed Aug. 16, 1961
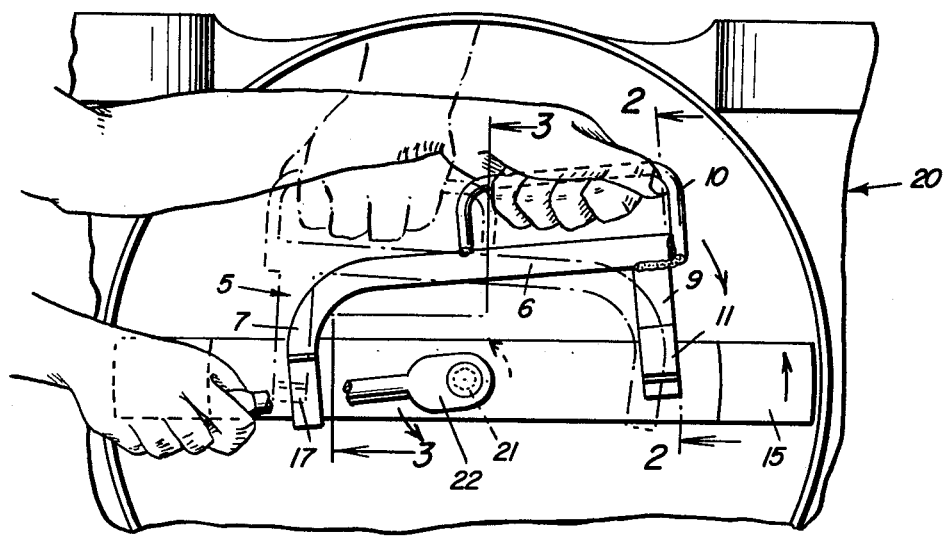
Fig. 1
Fig. 2
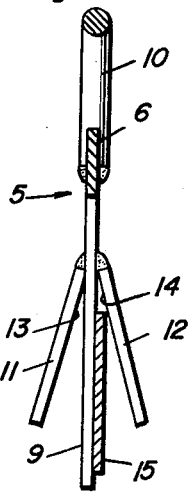
Fig. 3
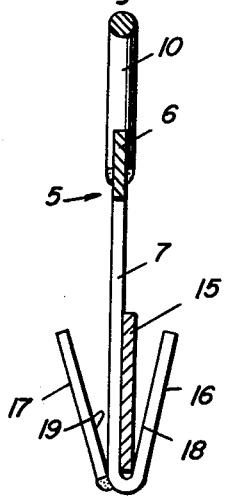
Fig. 4
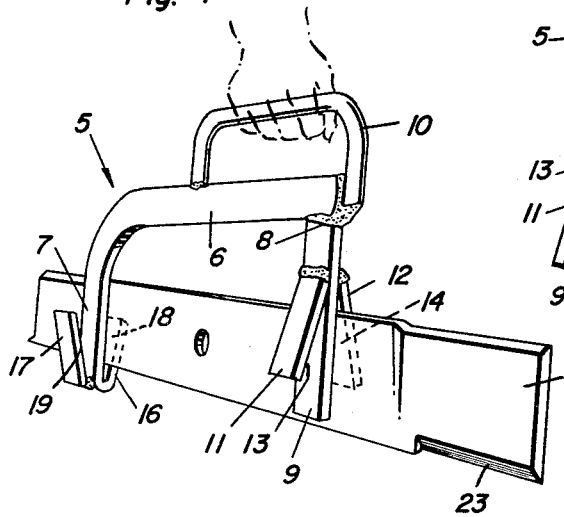
Carl A. Guderjan
Herman H. Redenius
INVENTORS.
BY *Clarence A. O'Brien*
*and Harvey B. Jackson*
Attorneys

United States Patent Office 3,134,280
Patented May 26, 1964

3,134,280
ROTARY MOWER BLADE HOLDER
Carl A. Guderjan, 708 W. Davidson, Roanoke, Ill., and Herman H. Redenius, Box 125, Benson, Ill.
Filed Aug. 16, 1961, Ser. No. 131,818
2 Claims. (Cl. 81—3)

The present invention generally relates to power lawn mowers of the rotary blade type and has for its primary object to provide unique means for firmly holding the blades of such mowers against turning, thus facilitating loosening or tightening the usual nuts or bolts which secure said blades to the corresponding power output shafts.

Another important object of this invention is to provide, in a manner as hereinafter set forth, a tool or wrench of the character described which will permit the blade, if desired, to be removed from the mower, carried or handled and then replaced without the necessity of touching said blade with the hands.

Other objects of the present invention are to provide a rotary mower blade holding wrench or tool which will be of relatively simple construction, strong and durable, compact, light in weight and which may be produced and marketed at low cost.

All of the foregoing and still further objects and advantages of the invention will become apparent from a study of the following specification, taken in connection with the accompanying drawing wherein like characters of reference designate corresponding parts throughout the several views, and wherein:

FIGURE 1 is a view in side elevation, showing a tool embodying the present invention in use;

FIGURE 2 is a cross-sectional view on an enlarged scale, taken substantially on the line 2—2 of FIGURE 1;

FIGURE 3 is a cross-sectional view on an enlarged scale, taken substantially on the line 3—3 of FIGURE 1; and FIGURE 4 is a perspective view, showing the removed blade mounted on the tool.

Referring now to the drawing in detail, it will be seen that the embodiment of the present invention which has been illustrated comprises a generally U-shaped frame of suitable metal which is designated generally by reference numeral 5. The frame 5 may also be of any desired dimensions. The frame 5, in the embodiment shown, includes a longitudinal bar 6 having formed integrally with one end thereof and extending substantially at a right angle thereto a leg or arm 7, said bar 6 being substantially L-shaped. Affixed by welding, as at 8, to the other end portion of the bar 6 and extending therefrom at a right angle thereto is a leg or arm 9. Also affixed as by welding to the end portion of the bar 6 which carries the leg or arm 9 is a generally inverted U-shaped handle 10.

Affixed by welding to the sides of the end portion 9 of the frame 5, at an intermediate point on the member of the frame 5, at a pair of downwardly divergent jaws or arms 11 and 12. In conjunction with the end portion 9 of the frame 5, the members 11 and 12, which are downwardly divergent, define downwardly opening, generally V-shaped sockets 13 and 14 for the reception of an end portion of the blade 15 being removed or replaced.

The end portion 7 of the frame 5 terminates in a substantially reversely bent hook 16 which, in conjunction with the adjacent side of the frame, also defines a generally V-shaped socket or groove for receiving the other end portion of the blade 15. Welded to the opposite side of the end portion 7 of the frame 5 is a hook 17 providing a socket for receiving the blade. It will be noted that the members 16 and 17 are upwardly divergent. The sockets provided by the members 16 and 17 are indicated at 18 and 19, respectively.

In FIGURE 1 of the drawing reference numeral 20 designates generally the bottom of a rotary power lawn mower which has been turned on its side to render the blade 15 thereof accessible. In use, to loosen the retaining nut 21 preparatory to removing the blade 15, one end portion of said blade is engaged in the socket 14 and the other end portion of said blade is engaged in the socket 18. Then, while gripping the handle 10 firmly with one hand, thus holding the blade 15 stationary against counterclockwise rotation, a suitable ratchet wrench 22 is applied to the nut 21 for unscrewing same in an obvious manner. When the tool is thus applied the blade 15 is wedged and frictionally retained in the sockets 14 and 18 thus mounting said blade on the tool. As indicated in broken lines in FIGURE 1 of the drawing, when the nut 21 is to be tightened the tool is reversed and the blade 15 is engaged in the sockets 13 and 19 and held against clockwise turning as the nut is rotated in this direction. The construction and arrangement, it will be noted, is such as to permit the tool to be applied at all times to the outer or lower side of the blade as shown in FIGURES 2 and 3 and with the tool on the same side of the longitudinal centerline of the blade. It also will be observed that the tool does not contact the cutting edges 23 of the blade.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool for holding a rotary mower blade of the type having cutting edges on its opposite end portions and receiving a shank-type fastener through an opening formed through its approximate mid-point about which said blade is to be rotated, said tool comprising an elongated generally U-shaped frame including a pair of generally flat parallel legs extending in the same plane and interconnected at one pair of corresponding ends by means of a bight portion, the corresponding side of each of said legs including means defining a socket for snugly receiving and frictionally engaging at least one side and one longitudinal edge portion of said blade, one of the sockets opening toward the free end of the corresponding leg and the other socket opening toward the bight portion of the frame.

2. The combination of claim 1 wherein said bight portion includes an elongated rod-like handle generally paralleling said bight portion and disposed to the side of one end thereof remote from said legs.

References Cited in the file of this patent

UNITED STATES PATENTS

| | | |
|---|---|---|
| 293,661 | McKean | Feb. 19, 1884 |
| 913,625 | David | Feb. 23, 1909 |
| 1,817,233 | Bumgardner | Aug. 4, 1931 |
| 2,490,739 | Nesbitt | Dec. 6, 1949 |
| 2,539,262 | Moore | Jan. 23, 1951 |
| 2,682,189 | Bergman | June 29, 1954 |